US009352652B2

(12) United States Patent
Montemayor Cavazos et al.

(10) Patent No.: US 9,352,652 B2
(45) Date of Patent: May 31, 2016

(54) COUPLER FOR ELECTRIC VEHICLE CHARGING STATION

(75) Inventors: Marcel Montemayor Cavazos, Nuevo Leon (MX); Gerardo Rodriguez Najera, Nuevo Leon (MX); Eduardo Herrejon Alvarado, Nuevo Leon (MX)

(73) Assignee: Schneider Electric USA, Inc., Palatine, IL (US)

( * ) Notice: Subject to any disclaimer, the term of this patent is extended or adjusted under 35 U.S.C. 154(b) by 727 days.

(21) Appl. No.: 13/539,147

(22) Filed: Jun. 29, 2012

(65) Prior Publication Data

US 2014/0002018 A1   Jan. 2, 2014

(51) Int. Cl.
*H02J 7/00* (2006.01)
*B60L 3/00* (2006.01)
(Continued)

(52) U.S. Cl.
CPC .............. *B60L 3/00* (2013.01); *B60L 11/1805* (2013.01); *B60L 11/1818* (2013.01); *B60L 11/1825* (2013.01); *B60L 11/1846* (2013.01); *B60L 11/1848* (2013.01); *B60L 2230/12* (2013.01); *B60L 2230/16* (2013.01); *B60L 2240/70* (2013.01); *B60L 2240/80* (2013.01); *B60L 2250/10* (2013.01); *B60L 2250/12* (2013.01); *B60L 2250/16* (2013.01); *B60L 2250/20* (2013.01); *B60L 2270/32* (2013.01); *B60L 2270/34* (2013.01); *B60L 2270/36* (2013.01); *H01R 13/6275* (2013.01); *H01R 13/6397* (2013.01); *Y02T 10/7005* (2013.01); *Y02T 10/7088* (2013.01); *Y02T 10/7291* (2013.01); *Y02T 90/121* (2013.01); *Y02T 90/128* (2013.01);

(Continued)

(58) Field of Classification Search
CPC . Y02T 10/7005; Y02T 90/14; B60L 11/1809; B60L 11/1846; B60L 3/00
USPC .......................................... 320/109, 111, 123
See application file for complete search history.

(56) References Cited

U.S. PATENT DOCUMENTS 5,306,999 A    4/1994  Hoffman
5,349,535 A *  9/1994  Gupta ............................ 702/63
(Continued)

FOREIGN PATENT DOCUMENTS

CA          2811164 A1 *  3/2012
JP        2010264847       11/2010
(Continued)

OTHER PUBLICATIONS

International Search Report and the Written Opinion of the International Searching Authority for International Application No. PCT/US2013/048490 mailed on Oct. 11, 2013.

*Primary Examiner* — Helen Rossoshek
(74) *Attorney, Agent, or Firm* — Banner & Witcoff, Ltd.

(57) ABSTRACT

Systems, methods, devices, and computer-readable media secure a coupler 101 of an electric vehicle charging station 100 by locking the coupler 101 to the electric vehicle charging station 100 or an electric vehicle 210. A locking mechanism is provided within the coupler 101. The locking mechanism may include an actuator 432 configured to move between a lock and unlock position. When the actuator 432 is in the lock position, the coupler 101 may be locked to the charging station 100 or an electric vehicle 210. Whereas, when the actuator 432 is in the unlock position, the coupler 101 may be removed from the charging station 100 or electric vehicle 210. Further, the charging station 100 may include an identification device 437 for determining when to lock or unlock the coupler 101.

20 Claims, 6 Drawing Sheets

(51) Int. Cl.
*B60L 11/18* (2006.01)
*H01R 13/627* (2006.01)
*H01R 13/639* (2006.01)

(52) U.S. Cl.
CPC . *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 5,563,491 A | * | 10/1996 | Tseng | 320/109 |
| 5,751,135 A | | 5/1998 | Fukushima et al. | |
| 5,909,100 A | * | 6/1999 | Watanabe et al. | 320/108 |
| 5,934,918 A | | 8/1999 | Wuechner | |
| 8,025,526 B1 | | 9/2011 | Tormey et al. | |
| 8,111,043 B2 | * | 2/2012 | Redmann | 320/109 |
| 8,169,186 B1 | * | 5/2012 | Haddad et al. | 320/109 |
| 8,558,504 B2 | * | 10/2013 | Brown et al. | 320/109 |
| 8,569,993 B2 | * | 10/2013 | Wolfien | 320/109 |
| 8,573,994 B2 | * | 11/2013 | Kiko et al. | 439/188 |
| 8,664,917 B2 | * | 3/2014 | Jenkins et al. | 320/115 |
| 8,680,813 B2 | * | 3/2014 | Lowenthal et al. | 320/109 |
| 8,774,997 B2 | * | 7/2014 | Ichikawa et al. | 701/22 |
| 8,823,486 B2 | * | 9/2014 | Jung et al. | 340/5.6 |
| 2010/0010698 A1 | * | 1/2010 | Iwashita et al. | 701/22 |
| 2010/0228405 A1 | * | 9/2010 | Morgal et al. | 701/2 |
| 2011/0145141 A1 | * | 6/2011 | Blain | 705/39 |
| 2011/0241824 A1 | * | 10/2011 | Uesugi | 340/5.8 |
| 2011/0300733 A1 | * | 12/2011 | Janarthanam et al. | 439/304 |
| 2012/0217928 A1 | * | 8/2012 | Kulidjian et al. | 320/109 |
| 2013/0088199 A1 | * | 4/2013 | Matsuno et al. | 320/109 |
| 2013/0106350 A1 | * | 5/2013 | Ono et al. | 320/109 |
| 2013/0113425 A1 | * | 5/2013 | Kauffmann | 320/109 |
| 2013/0134933 A1 | * | 5/2013 | Drew et al. | 320/109 |
| 2013/0170604 A1 | * | 7/2013 | Falk | H04Q 9/00 377/15 |
| 2013/0181674 A1 | * | 7/2013 | Tremblay et al. | 320/109 |
| 2013/0257373 A1 | * | 10/2013 | Mallon et al. | 320/109 |
| 2013/0300429 A1 | * | 11/2013 | Jefferies et al. | 324/511 |
| 2013/0320920 A1 | * | 12/2013 | Jefferies et al. | 320/109 |
| 2013/0337669 A1 | * | 12/2013 | Najera et al. | 439/133 |
| 2014/0002009 A1 | * | 1/2014 | Choi | 320/107 |
| 2014/0167692 A1 | * | 6/2014 | Gonzalez et al. | 320/109 |

FOREIGN PATENT DOCUMENTS

| | | |
|---|---|---|
| WO | 2010060370 | 6/2010 |
| WO | 2012034216 | 6/2012 |

* cited by examiner

COUPLER FOR ELECTRIC VEHICLE CHARGING STATION

FIELD OF ART

Aspects of the disclosure generally relate to securing a coupler of an electric vehicle charging station, and in particular, a locking mechanism of the coupler to secure the coupler to the electric vehicle charging station or an electric vehicle inlet.

BACKGROUND

Demand for electric supply equipment is growing as the desire to reduce the global dependency on fossil fuels increases. As technology related to electric motors advances, more and more electric motors replace combustion engines. This effect has already begun in the automotive industry. Today, hybrid and electric vehicles are becoming increasingly popular. Accordingly, demand for supplying these vehicles with electric power is rising.

To meet this demand, individuals and corporations have been increasing production and installation of electric vehicle charging stations, also referred to as electrical vehicle supply equipment (EVSE). Among other components, this equipment typically includes a coupler at one end of a cable for connecting the charging station to an electric vehicle so that an electric supply may be delivered from a power supply source to the electric vehicle. For practical purposes, standards have been developed to bring uniformity to the design of couplers. Due to these standards, users of electric vehicles can be assured that they will find an electric vehicle charging station with a coupler adapted to fit their particular electric vehicle. While standards serve an invaluable purpose, they also set limits on the design of the couplers.

The coupler is an important component of the charging station because without it power cannot be supplied to electric vehicles. In addition to performing a meaningful function, the coupler itself may have considerable monetary value. For these reasons, couplers may be targets of vandalism. Among all the components of the charging station, the coupler may be most susceptible to vandalism, in part, because it is necessarily exposed to the environment surrounding the charging station so that it may be readily accessible.

Further, couplers may be particularly vulnerable to theft and/or vandalism because charging stations may be installed in numerous locations. That is, the charging stations may be spread out over a large area instead of being grouped together as traditional gas pumps are at a gas station. Therefore, it may be especially difficult for an owner or operator to monitor multiple charging stations.

Accordingly, new systems and methodologies are required to secure the couplers of charging stations while maintaining user friendliness, safety, and cost of ownership.

BRIEF SUMMARY

In light of the foregoing background, the following presents a simplified summary of the present disclosure in order to provide a basic understanding of some aspects of the invention. This summary is not an extensive overview of the invention. It is not intended to identify all key or critical elements of the invention or to delineate the scope of the invention. The following summary merely presents some concepts of the invention in a simplified form as a prelude to the more detailed description provided below.

Currently, couplers can be disconnected from charging stations and electric vehicles by anyone. That is, there is no locking mechanism that prevents or hinders a person's ability to disconnect the coupler from the charging station and the electric vehicle whenever he/she desires. Aspects of the present disclosure provide a locking mechanism within the coupler that secures the coupler to the charging station and/or the electric vehicle. Notably, the locking mechanism may include a push button, actuator (e.g., solenoid), and snap. The actuator may move between a lock position and unlock position. When the actuator is in the lock position the push button is prevented from being pushed down, and therefore, the snap cannot be moved. Meanwhile, when the actuator is in the unlock position, the push button may be pushed down causing the snap to release from the charging station or electric vehicle.

Because the locking mechanism is included within the coupler, no external components are needed to modify the charging station or electric vehicle. Moreover, the locking mechanism of the present disclosure may control who is able to disconnect the coupler and/or at what times the coupler may be disconnected. The coupler may interface with a processor or other device for determining whether a user is authorized to unlock the coupler. For example, the coupler may include a fingerprint reader integrated with the push button for identifying a user in order to determine whether the user is authorized to unlock the coupler.

Another aspect of the locking mechanism is that it may be implemented in any coupler complying with any known and foreseeable standard. In particular, the locking mechanism may be incorporated in a coupler that is compatible with the following standard: "SAE Recommended Practice J1772, SAE Electric Vehicle and Plug in Hybrid Electric Vehicle Conductive Charge Coupler" (hereinafter referred to as SAE J1772). Accordingly, this disclosure provides a coupler that may be universally implemented.

Aspects of the disclosure address one or more of the issues mentioned above by disclosing methods, computer readable media, and apparatuses for providing an improved charging station having a specially designed coupler. For example, aspects of the disclosure provide a method of using the charging station, and, in particular, a method of using the coupler. Further, example steps are provided to explain how and when a coupler may be locked and unlocked.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present disclosure are set forth in the accompanying drawings and the description below. Other features and advantages of the invention will be apparent from the description and drawings and from the claims.

BRIEF DESCRIPTION OF THE DRAWINGS

The present disclosure is illustrated by way of example and is not limited in the accompanying figures in which like reference numerals indicate similar elements and in which.

DETAILED DESCRIPTION

In accordance with various aspects of the disclosure, methods, computer-readable media, and apparatuses are disclosed to lock a coupler to a charging station or electric vehicle. Herein, locking a coupler may refer to preventing or hindering the coupler from being disconnected. The coupler may be configured so that it may only be unlocked after electronically identifying an authorized user. Moreover, the coupler may be further configured to include a locking mechanism having an actuator within a handle of the coupler. Because the actuator is within the coupler, it may be capable of locking the coupler to an electric vehicle. The actuator may move between an unlock and lock position to control whether a push button on the coupler may be pushed down by a user. When the push button is capable of being pushed down, a lever connected to the push button may move causing a snap at the other end of the lever to release the coupler from the charging station or electric vehicle. Specifically, the snap may rise above a groove on the receptacle of the charging station or electric vehicle. With the snap positioned above the groove, the coupler may be pulled away from the receptacle of the charging station or electric vehicle thereby disconnecting the coupler.

Further, to control the actuator, a communication wire may be connected between a processor in the charging station and the actuator. In addition, another communication wire may be connected between an identification device on the coupler and the charging station. Herein, an identification device may be any device, such as a fingerprint scanner, for capturing identification information of a user. The identification device may transmit the identification information to the charging station via a communication wire so that a processor or application specific integrated circuit (ASIC) at the charging station may perform the identification and authorization. In an example embodiment, the identification device may include a fingerprint scanner incorporated into the push button.

Although each of the example embodiments illustrated in the figures is in compliance with SAE J1772, it is contemplated that one of ordinary skill in the art would be capable of adapting the example embodiments to suite other standards now available or to come. Further, it should be understood that aspects of the disclosure may be applicable to other types of electric supply equipment having couplers with similar standards.

Figure 1:
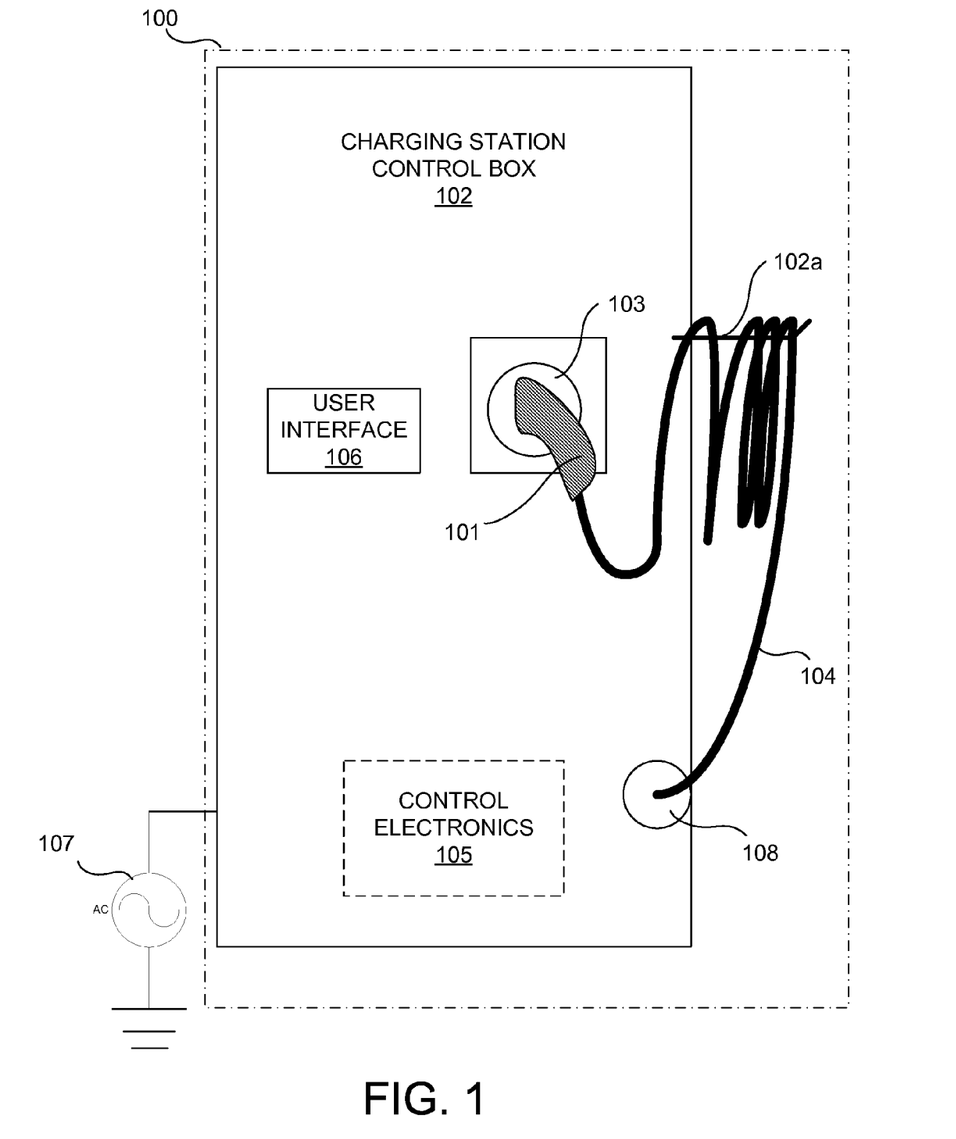
FIG. 1 is a diagram illustrating an example configuration of an electric vehicle charging station according to an aspect of the present disclosure.

FIG. 1 is a diagram illustrating an example configuration of an electric vehicle charging station (hereinafter referred to as a charging station) 100 according to an aspect of the present disclosure. It should be understood that FIG. 1 does not show all components of the charging station 100, and instead focuses on some basic components of the charging station 100, as specified in SAE J1772. Further, FIG. 1 shows the charging station in a state in which the coupler 101 is connected to the charging station itself, and therefore, is not charging an electric vehicle.

As shown in FIG. 1, the charging station 100 may include a coupler 101, a charging station control box 102 having a bracket 102a, a charging station receptacle 103, a cable 104, control electronics 105, and a user interface 106. FIG. 1 also illustrates that the charging station 100 is connected to an electric power source 107. The electric power source may supply alternating current (AC) power and/or direct current (DC) power. Also, the electric power source may be configured to supply various levels of electric power. For example, the electric power source may provide 120 VAC and/or 240 VAC. Moreover, in a case in which AC power is supplied, the frequency of the alternating current may vary (e.g., 60 Hz, 50 Hz, etc.). During charging, the electric power is supplied from the electric power source 107 to the cable 104.

The cable 104 may include a plurality of conductors. Some of the conductors in the cable 104 may be used to deliver the electric power during charging while others may serve other purposes, such as monitoring the state of the coupler 101. In addition, the cable 104 may include an insulator for insulating the conductors inside. As shown in FIG. 1, the cable 104 connects the charging station control box 102 at a fixed position 108 to the coupler 101. In some embodiments, the cable 104 may be fixedly or removably connected to the charging station control box 102 and/or the coupler 101. However, from a safety or regulatory standpoint, it may be desirable to fixedly connect the cable 104 to the charging station control box 102 and the coupler 101.

In an aspect of the disclosure, the coupler 101 may be configured to connect to the charging station receptacle 103. The configuration of the charging station receptacle 103 may vary, but may include certain features, such as a groove (not shown), for interfacing with coupler 101. In some embodiments, the charging station receptacle 103 may be configured to electrically connect to the coupler 101, whereas in other embodiments the charging station receptacle 103 may include other mechanical components. Also, as shown in FIG. 1, the charging station receptacle 103 may be situated on the charging station control box 102 at a location that is readily accessible by users. The charging station receptacle 103 may aid in protecting the cable 104 and coupler 101 from being damaged as it may keep the coupler 101 and cable 104 off of the ground where, for example, it may be run over by a vehicle.

The charging station control box 102 may refer to a main structure that houses one or more components of the charging station 100. Although shown as a single structure, the charging station control box 102 may be the compilation of multiple separate structures. FIG. 1 illustrates that the charging station control box 102 may house control electronics 105. The control electronics 105 are depicted as a block with dashed borders to illustrate that the control electronics 105 may be housed inside the charging station control box 102 (i.e., that they might not be exposed to the environment). The control electronics 105 may be configured to open and close a contactor (not shown) to control delivery of the electric power supply, and thus, control a charging operation. The control electronics 105 may also perform other functions such as monitoring the connection of the coupler 101 and locking and/or unlocking the coupler 101 as described in further detail below. To perform these functions, the control electronics 105 may comprise various circuit components, such as resistors, capacitors, inductors, etc., and/or one or more integrated circuits. In some embodiments, the control electronics 105 may be implemented on a printed circuit board (PCB). Additionally, or alternatively, the control electronics 105 may include one or more processors and memory for storing computer-executable instructions that may be performed by the one or more processors. Although not shown in FIG. 1, the control electronics 105 may be electrically connected to a conductor in the cable 104, and therefore, may also electrically connect to the coupler 101.

Furthermore, the control electronics 105 may be electrically connected to the user interface 106. The user interface 106 may include an input unit, such as a keypad, touchscreen, magnetic card reader, fingerprint scanner, a radio frequency identification (RFID) reader, etc., and/or a display unit, such as a screen, a light emitting diode (LED) display, etc. In particular, the user interface 106 may include a credit card reader so that users may perform a payment transaction. Like the charging station receptacle 103, the user interface 106 may also be positioned on the charging station control box 102 at a location that is readily accessible by users.

Figure 2:
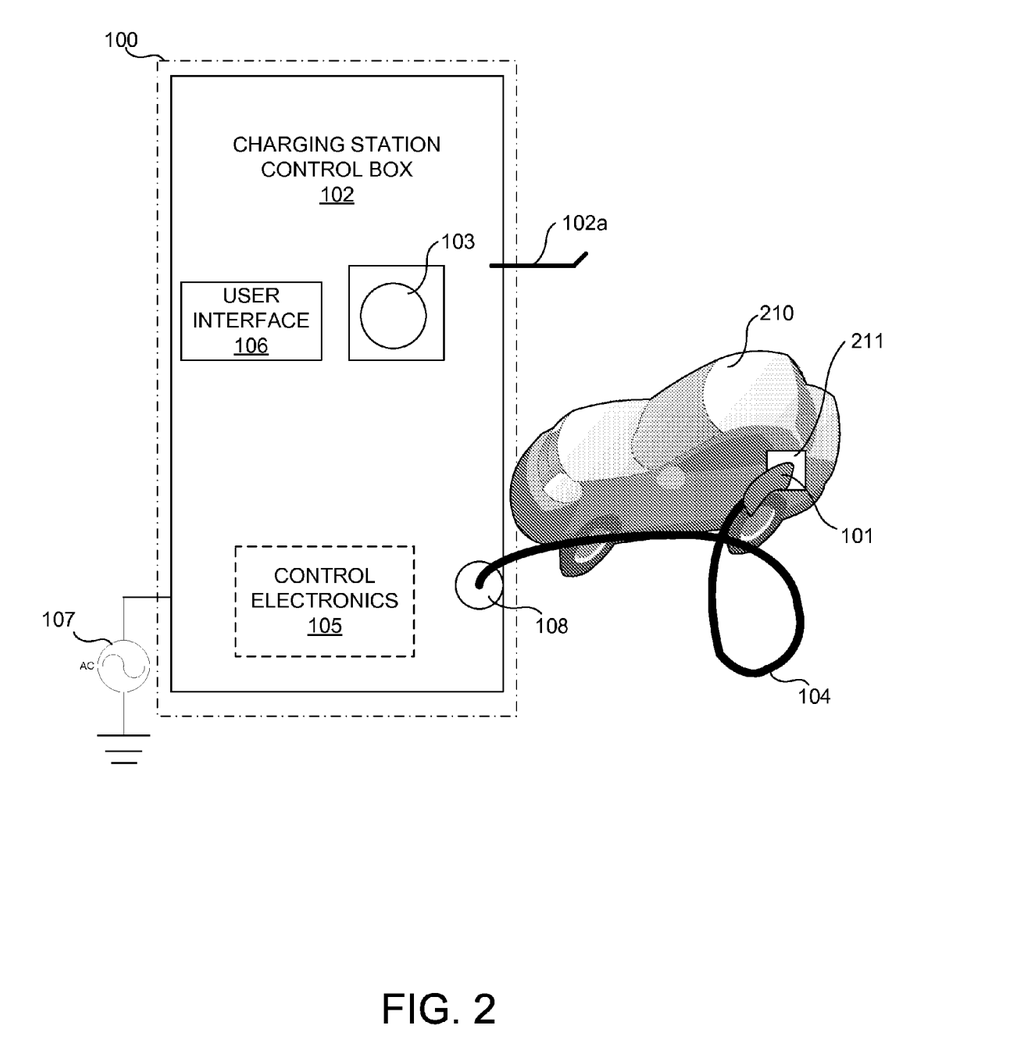
FIG. 2 is a diagram illustrating another view of the electric vehicle charging station according to an aspect of the present disclosure.

FIG. 2 illustrates another example view of the charging station 100. As shown in FIG. 2, the charging station 100 may be connected to an electric vehicle 210. Specifically, the coupler 101 of the charging station 100 is connected to an electric vehicle inlet 211 of the electric vehicle 210. The electric vehicle inlet 211 may be configured to electrically connect to one or more of the conductors in the cable 104. In particular, the electric vehicle inlet 211 may be configured to connect to the cable 104 to receive electric power. Further, the electric vehicle inlet 211 may be configured to transfer the electric power to a battery so that the electric vehicle 211 may be charged. In addition to being configured to electrically connect to the coupler 101, the electric vehicle inlet 211 may also be configured to mechanically connect to the coupler 101. That is, the electric vehicle inlet 211 may include a groove or other mechanical component for the coupler 101 to latch onto.

FIG. 2 also shows elements similar to those shown in FIG. 1. Like elements have been assigned like reference characters, and thus, further description of such elements will be omitted.

Figure 3:
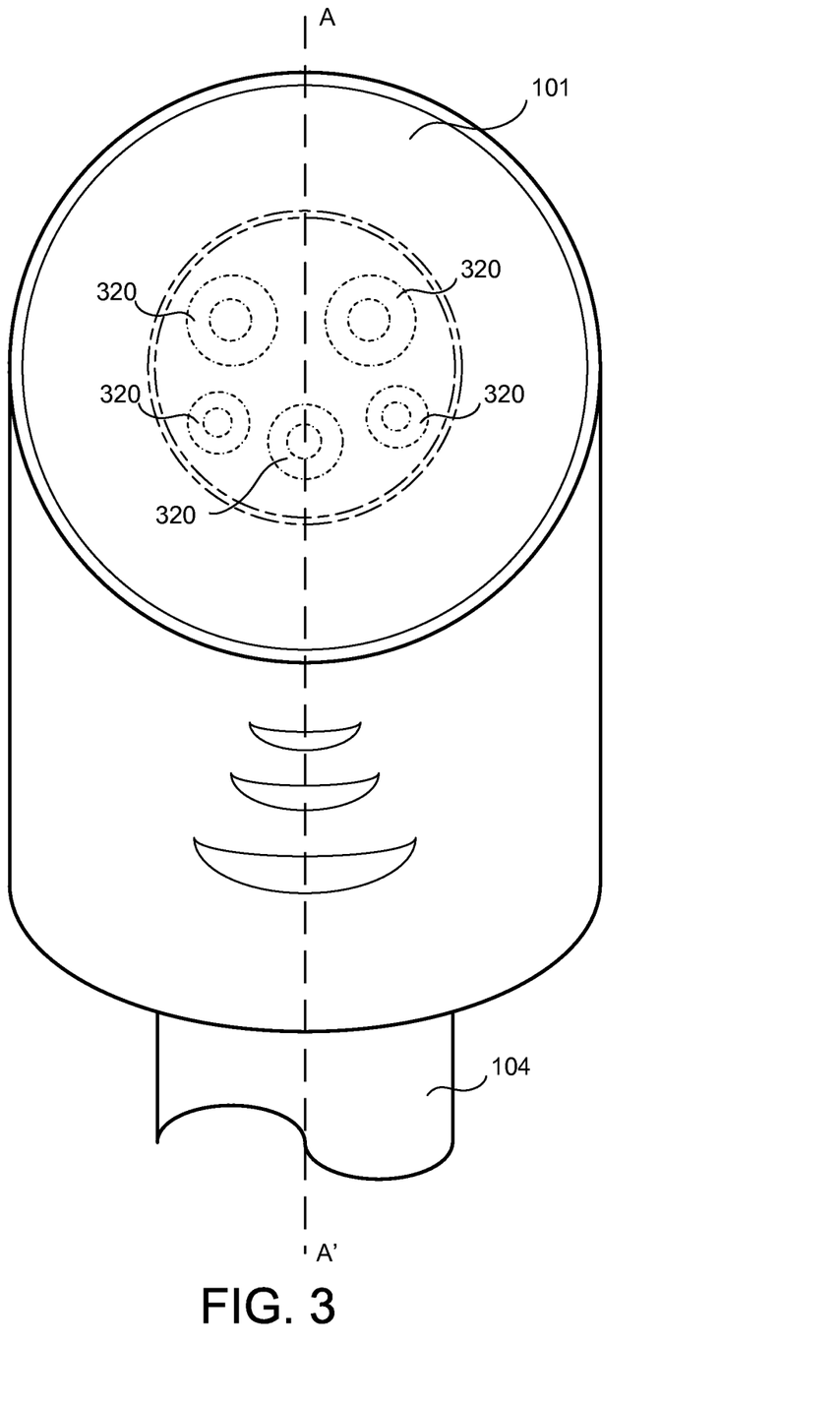
FIG. 3 is a diagram illustrating an example configuration of a coupler of the electric vehicle charging station according to an aspect of the present disclosure.

FIG. 3 illustrates a face of the coupler 101 in accordance with an aspect of the disclosure. As shown, the face of the coupler 101 may include five contacts 320 configured to electrically connect the conductors of the cable 104 with conductors of the electric vehicle inlet 211. The five contacts 320 may include two power contacts for supplying electric power, a ground contact for connecting a ground terminal of the electric vehicle inlet 211 to an equipment ground of the charging station 200, a proximity line contact for use in detecting the connection of the coupler 101 to the electric vehicle inlet 211, and a pilot contact for use in monitoring the charging of the electric vehicle 210.

Figure 4:
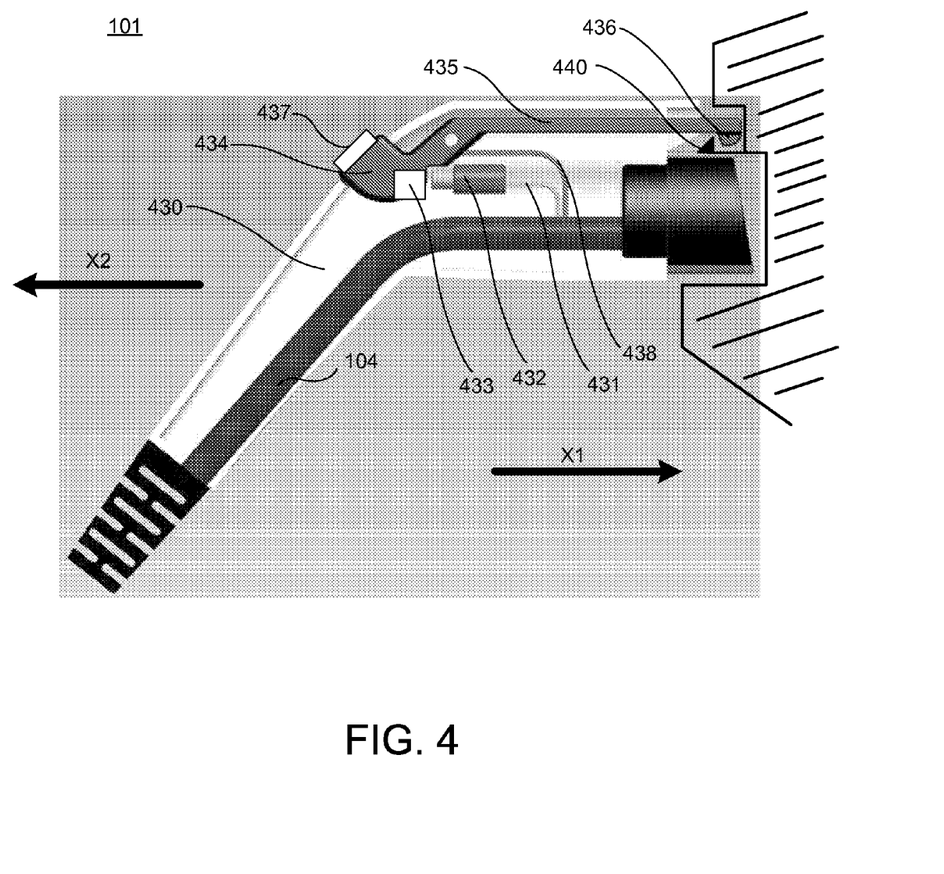
FIG. 4 is a diagram illustrating another view of the coupler of the electric vehicle charging station according to an aspect of the present disclosure.

FIG. 4 illustrates an example configuration of the coupler 101. Specifically, FIG. 4 provides a cross-sectional view of the coupler 101 shown in FIG. 3 along line A-A'. The outside of the coupler 101 may be referred to as a handle 430. The handle 430 may include the face of FIG. 3 having the five contacts 320 therein. Further, the handle 430 may be a shell made of plastic or another suitable material for enclosing many of the components of the coupler 101. The handle 430 may be shaped so that the coupler 101 may be easily gripped. That is, the handle 430 of the coupler 101 may have an ergonomic design.

At the end of the handle 430, the coupler 101 may expose the five contacts 320 (not shown in FIG. 4). The handle 430 may also connect the cable 104 of the charging station 100 to the five contacts 320. As explained above, the cable 104 may include a plurality of conductors. In addition to the conductors described above, the cable 104 may also include a communication wire 431 for connecting an actuator 432 to the charging station 100. In some embodiments, the communication wire 431 may include one or more wires for supplying electric current to the actuator 432. The actuator 432 may be configured to move in response to an electrical signal transmitted via the communication wire 431. The actuator 432 may be a solenoid, rotative motor, or other similar device. Where the actuator is a solenoid, moving in response to the electrical signal may include extending an armature or plunger of the solenoid. Although only one actuator 432 is shown in FIG. 4, one or more actuators may be incorporated into the handle 430. The actuator 432 may move a stopper 433 configured to physically block (or stop) a push button 434 from being pushed down. In some embodiments, the stopper 433 may simply be an end of the actuator 432 itself. The actuator 432 may move between a lock position and an unlock position, and therefore, the stopper 433 may also move between a lock position and an unlock position. When the stopper 433 is in the lock position, the stopper 433 physically blocks the push button 434 from being pushed down. Meanwhile, when the stopper 433 is in the unlock position, the push button 434 may be pushed down.

As shown in FIG. 4, the push button 434 may be exposed to an outside of the handle 430, so that a user may push down on the push button 434. The push button 434 may be connected to a lever 435. The other end of the lever 435 may be connected to a snap 436. In some embodiments, the push button 434, lever 435, and snap 436 may be a single piece (i.e., may be made from a single mold). The push button 434, lever 435, and snap 436 may be configured so that when the push button 434 is in an up position (i.e., when the push button 434 is not being pushed down), the snap is in a down position. However, when the push button 434 is pushed down into a down position, the lever 435 may move the snap 436 into an up position. Further, the snap 436 may be shaped so that when a force is applied to the coupler 101 in the X1 direction, the snap 436 may snap onto a groove 440. In particular, the snap 436 may include an inclined surface for forcing the snap 436 to slide up and over the groove 440. The groove 440 may be a part of an electric vehicle inlet 211 or a charging station receptacle 103. When the snap 436 snaps onto the groove 440, the coupler 101 is latched to whatever structure includes the groove 440 (e.g., the charging station receptacle 103 or electric vehicle inlet 211). Once latched, the coupler 101 may not be removable from the structure it is latched to unless the push button is pressed down. By pressing down on the push button 434, the lever 435 may raise the snap 436 above the groove 440 so that the coupler 101 may be pulled back in the X2 direction without being stopped by the groove 440.

In light of the above, the coupler 101 may be locked to a structure, such as the charging station receptacle 103 or electric vehicle inlet 211, when the snap 436 is latched onto the groove 440 and the stopper 433 is in the lock position. In this case, the stopper 433 prevents the push button 434 from being pressed down, and therefore, the snap 436 cannot be raised above the groove 440 in order to release the coupler 101. Once locked, the coupler 101 may only be released if the actuator 432 is activated to move the stopper 433 to the unlock position or to cease providing a force to keep the stopper 433 from moving to the unlock position.

In some embodiments, the coupler 101 may also include an identification device (ID device) 437. For example, as illustrated in FIG. 4, the ID device 437 may be implemented as a fingerprint reader. Moreover, for user convenience, the fingerprint reader may be incorporated into the push button 434 so that the fingerprint reader may obtain a user's fingerprint when the user presses his/her finger against the push button 434. An example fingerprint reader that may be suitable for the coupler 101 is the XB5S Harmony™ Biometric Switch produced by Schneider Electric USA, Inc. The ID device 437 may capture identification information, which may be any information (e.g., image data, voice data, alphanumeric string, etc.) from which a user may be identified. In the case where the ID device 437 includes a fingerprint reader, the identification information may be a fingerprint image. Instead of a fingerprint reader, the ID device 437 may be implemented with a camera, retinal scanner, RFID reader, magnetic strip reader (e.g., credit card reader), keypad, microphone, etc.

Where the coupler 101 includes an ID device 437, the coupler 101 may also include a second communication wire 438. As shown in FIG. 4, the second communication wire 438 may be included in the cable 104. In some embodiments, the second communication wire 438 may include one or more wires for supplying electric power to the ID device 437. The second communication wire 438 may be configured to communicate the identification information obtained by the ID device 437 to the charging station 100. Specifically, the identification information may be transmitted via the second communication wire 438 to a processor of the charging station 100, which may process the identification information to determine whether a user is authorized to unlock the coupler 101. Therefore, because of the second communication wire 438, authentication steps may be performed outside the coupler 101.

As mentioned above, FIG. 4 is an example embodiment of the coupler 101. Other configurations of the coupler 101 may accomplish similar results. For example, the coupler 101 may be configured so that the actuator 432 directly moves the lever 435 and/or snap 436 in response to receiving a signal indicating that a user is authorized to remove the coupler 101. In such an embodiment, if the identification information obtained from the ID device 437 indicates an authorized user, the actuator 432 may directly move the lever 435 and/or snap 436 so that the user does not have to press a push button 434. In yet another embodiment, the coupler 101 may be designed so that the snap 436 may be extended and retracted in response to the actuator 432. In this case, extending the snap 436 may latch the snap 436 to a groove 440 while retracting the snap 436 may pull the snap 436 over the groove 440 thereby unlatching the snap 436.

Further, although a push button 434 is primarily described above, other types of buttons may be implemented instead. For example a button (or switch) that slides sideways may be used instead of the push button 434 to raise the snap 436. Moreover, the coupler 101 may include additional components other than those shown. For example, the coupler may include a spring for applying a downward force to the lever 435 and/or snap 436. Also, the coupler 101 may include a processor for processing data obtained by the ID device 437 and/or a battery for supplying electric power to the ID device 437.

Additionally, while FIG. 4 illustrates the coupler 101 including the ID device 437, the ID device 437 may instead be located on/in the charging station control box 102. For example, the charging station control box 102 may include a fingerprint reader as the ID device 437 such that a user may be required to touch the fingerprint reader on the charging station control box 102 before he/she can move the coupler 101. In some embodiments, the ID device may be integrated with the user interface 106. For example, the user interface 106 may include a touchscreen for displaying information to the user and for capturing fingerprint data of a user.

Figure 5:
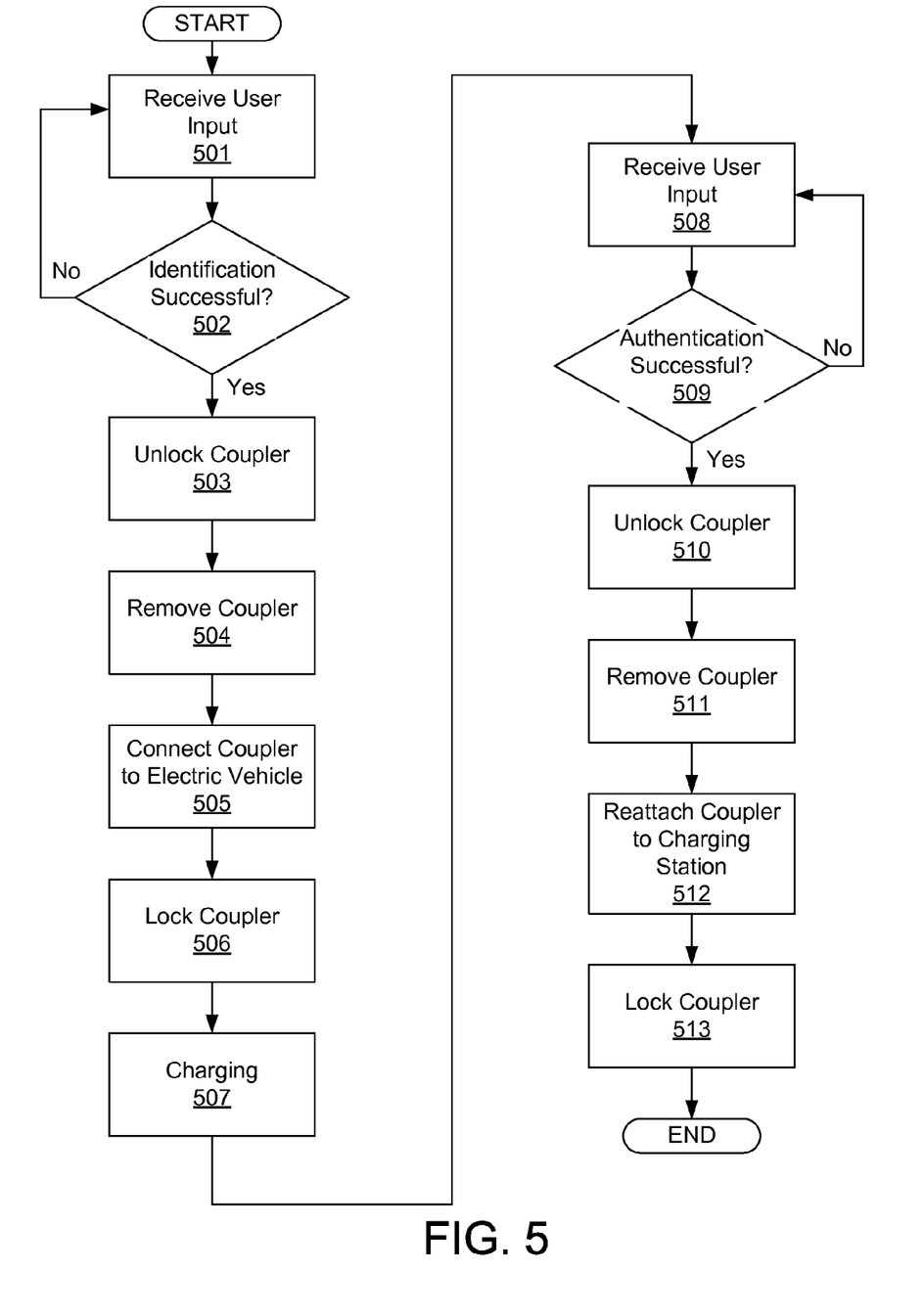
FIG. 5 is a flow diagram illustrating an example method according to an aspect of the present disclosure.

FIG. 5 illustrates a flow diagram of a method of the present disclosure. Specifically, the flow diagram shows steps of a process for using the coupler 101. The process of FIG. 5 assumes that the coupler 101 is coupled to the charging station receptacle 103 at the start of the process. Under this assumption, the process begins with step 501 in which a user inputs identification information. As described above, identification information may be any information from which a user may be identified. Various ways may be implemented to input identification information. For example, identification information may be input by swiping a card (e.g., a credit card), entering a password on a keypad, scanning a fingerprint, etc. Also, the identification information may be input via an ID device 437 on the coupler and/or an input device of the user interface 106 on the charging station control box 102.

Once a user input is received, identification of the user based on the user input is performed at step 502. In step 502, identification may simply include determining that the user input corresponds to identification information and storing the identification information. In some embodiments, the identification information included in the user input may be compared with known identification information (e.g., previously entered information or information in a database) in an attempt to identify the user. If the user cannot be identified, the process may return to step 501. In some cases, a user may be notified that identification failed. On the other hand, if identification is successful, the received identification information and/or an identifier (e.g., a name, ID number, etc.) for identifying the user may be stored in memory (e.g., a buffer). After the charging station 100 determines that identification is successful at step 502, the process may proceed to step 503.

At step 503, the coupler 101 may be unlocked. That is, a signal may be transmitted via the communication wire 431 to operate the actuator 432 to move the stopper 433 (or allow the stopper 433 to move) into an unlock position so that the push button may be pushed down. In some embodiments, transmitting a signal to operate the actuator 432 may include supplying electric power to the actuator 432 so that it may move. For example, step 503 may supply electric power to a solenoid causing an armature (or plunger) of the solenoid to move thereby pushing a stopper into a locked or unlocked position. Where the coupler 101 includes more than one actuator 432, step 503 may include transmitting a signal to one or more of the actuators 432.

In some examples, a light or other indicator may also be controlled to indicate that the push button has been released (e.g., that the push button may be pushed down). Further, when a push button is released, the charging station 100 may store a status indicator indicating that the status of the coupler 101 is such that it is released or unlocked. By storing and updating a status indicator, the charging station 100 may monitor a status of the coupler 101.

In step 504, the user may push down on the push button 434 to move the snap 436 above a groove 440 of the charging station receptacle 103. With the push button 434 in the down position, the user may then pull the coupler 101 away from the charging station receptacle 103 to release the coupler 101.

Next, at step 505, the user may connect the coupler 101 to an electric vehicle inlet 211 by pushing the coupler 101 towards the electric vehicle inlet 211 so that the snap 436 may snap (or latch) onto a groove 440 of the electric vehicle inlet 211. Performing this latching may also electrically connect the coupler 101 to the electric vehicle inlet 211. Once the electrical connection is established, the control electronics 105 may detect that the coupler 101 is connected to the electric vehicle 210. Specifically, the control electronics 105 may include a monitoring circuit for monitoring a pilot line in the cable 104 to detect the connection.

In step 506, the coupler 101 may be locked to the electric vehicle 211. That is, in response to detecting the connection in step 505, the control electronics 105 may transmit a signal via the communication wire 431 to the actuator 432 to move the stopper 433 into a lock position thereby preventing the push button 432 from being pushed down. Notably, because the coupler 101 may be designed so that the snap 436 latches to the groove 440 before (or soon after) the coupler 101 is electrically connected, the charging station 100 may ensure that the snap 436 is latched onto the groove 440 of the electric vehicle 210 when the actuator 432 goes to move the stopper 433 into the lock position.

With the coupler 101 electrically connected and locked to the electric vehicle inlet 211, the charging station 100 may begin charging the electric vehicle 210 at step 507. Specifically, electric power may be delivered from the charging station 100 via the cable 104 to the electric vehicle inlet 211, which in turn may deliver the electric power to a battery of the electric vehicle 210. While the electric vehicle 210 is charging in step 507, a user may feel comfortable walking away from the electric vehicle 210 knowing that the coupler 101 is secured to the electric vehicle 210 such that another person might not be able to remove the coupler 101. For example, a user may desire to go into a store located nearby the charging station 100 while the electric vehicle 210 is charging and not have to be concerned that another person might disconnect the coupler 101 from the electric vehicle 210 and charge their electric vehicle. Thus, user concerns that electric power may be stolen can be alleviated. Similarly, when a user is at home, he/she may be concerned that another person, e.g., a child, might disconnect the coupler 101 from the electric vehicle 210 while the electric vehicle 210 is charging. Therefore, knowing that the coupler 101 is secured to the electric vehicle 210 while at home may also alleviate safety concerns.

Next, user input is again received at step 508. As in step 501 described above, the user input may be identification information. In some embodiments, the user input received at step 508 may be different than the user input received at step 501. For example, a user may input identification information in step 501 by swiping a credit card whereas identification information may be received in step 508 when a user touches a fingerprint reader.

At step 509, authentication is performed. Specifically, step 509 determines whether a user who inputted identification information in step 508 corresponds to the user identified in step 502. To perform authentication, the identification information inputted in step 508 may be compared with the identification information inputted in step 501. Alternatively, where different types of identification information are inputted in steps 501 and 508, it may be determined whether the different types of identification information correspond to the same user. If the user is not authenticated at step 509 (e.g., the user is not the same person), the process returns to step 508 to wait for additional (or new) identification information. In some cases, the user may be notified that he/she has not been authenticated so that he/she may be warned or may be instructed to input authentication information again. Moreover, in some examples, a reason for the failed authentication may be provided to the user.

However, if authentication is successful, the process may proceed to step 510. In step 510, the actuator 432 may be activated to unlock the coupler 101. Step 510 may be performed in a similar manner to step 503.

Once unlocked, the coupler 101 may be removed from the electric vehicle 210 at step 511. Step 511 may be performed in a similar manner to step 504.

After releasing the coupler 101 from the electric vehicle 210, the user may reattach the coupler 101 to the charging station receptacle 103 of the charging station 100. In order to incentivize a user to reattach the coupler 101 to the charging station 100, a billing transaction may remain incomplete. For example, a first user may have to reattach the coupler 101 to complete a payment in order to prevent the first user from being billed for subsequent uses of the coupler 101 by others and/or to receive a receipt.

After the coupler 101 is reattached in step 512, the coupler 101 is again locked so that the coupler 101 is secured to the charging station 100 in step 513. In some embodiments, the charging station 100 may lock the coupler 101 in response to detecting that the coupler 101 electrically connected to the charging station receptacle 103. In other embodiments, the charging station 100 may lock the coupler 101 in response to detecting that the coupler 101 is reattached using a sensor (e.g., a pressure sensor) in the charging station receptacle 103. Still in other embodiments, the presence of the snap 436 at the charging station receptacle 103 may trigger the locking at step 513. By securing the coupler 101 to the charging station 100, the likelihood of the coupler 101 becoming damaged may be reduced. For example, securing the coupler 101 to the charging station receptacle 103 may prevent the coupler 101 from falling to the ground and/or being run over by a vehicle.

An example embodiment in accordance with the above process may include swiping a credit card at an input device of the user interface 106 to unlock the coupler 101, reading a fingerprint of the user when the user goes to remove the coupler 101 from the charging station 100; locking the coupler 101 to the electric vehicle 210; releasing the coupler 101 when the same fingerprint is detected; and incentivizing the user to reattach the coupler 101 to the charging station 100 when the user is done charging an electric vehicle 210.

Although the steps of FIG. 5 describe reattaching the coupler 101 after charging an electric vehicle 210, it should be understood that the same user may want to charge another electric vehicle 210. In such a situation, steps 505 through 511 may be repeated for the other electric vehicle after performing step 511 a first time. These additional steps may be performed in a case where the user is an attendant (e.g., employee) of the charging station 100 or otherwise responsible for charging electric vehicles 210 for customers.

Additionally, the charging station 100 may be configured to perform steps to monitor a status of the coupler 101. More specifically, the coupler 101 may be monitored to determine whether the coupler 101 is disconnected for a predetermined period of time. Where the charging station 100 determines that the coupler 101 has been disconnected for more than a predetermined period of time, the charging station 100 may alert the user or an owner/operator of the charging station 100. For example, the charging station 100 may detect that the coupler 101 has been disconnected from the electric vehicle 210 for more than five minutes, and therefore, may sound an alarm or play a recording to indicate that the coupler 101 needs to be reattached.

Figure 6:
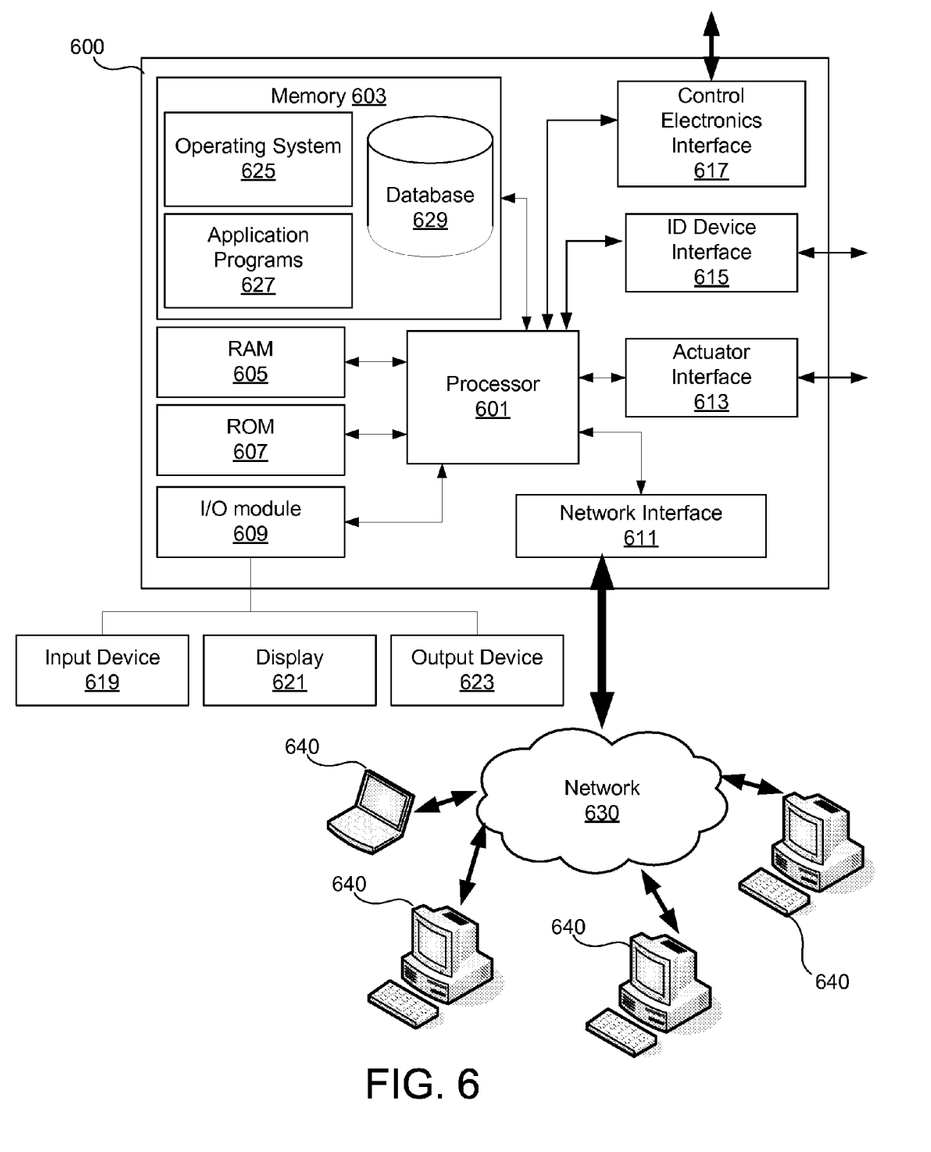
FIG. 6 is a block diagram of an example computing device that may be used according to an illustrative embodiment of the present disclosure.

FIG. 6 illustrates a block diagram of an example computing device 600 that may be used according to an illustrative embodiment of the present disclosure. In one or more embodiments of the present disclosure, the computing device 600 may be incorporated into the charging station 100. In particular, the computing device 600 may be incorporated into the control electronics 105 of the charging station 100 or incorporated as a separate controller within the charging station 100.

As shown in FIG. 6, the computing device 600 may have a processor 601 that may be capable of controlling operations of the computing device 600 and its associated components, including memory 603, RAM 605, ROM 607, an input/output (I/O) module 609, a network interface 611, an actuator interface 613, an ID device interface 615, and a control electronics interface 617.

The processor 601 may be configured to perform many of the functions described herein, and in particular, many of the steps discussed above with regards to FIG. 5. For example, the processor 601 may be configured to perform the identification and authentication steps. More specifically, the processor 601 may be configured to execute computer-executable instructions, which may be stored on the memory 603. Further, memory 603 may store software used by the computing device 600, such as an operating system 625 and/or application programs (e.g., a control application) 627, and may include an associated database 629.

As shown in FIG. 6, the I/O module 609 may include an input device 619, a display device 621, and an output device 623 (e.g., a light, an alarm, etc.). One or more of these devices may form the user interface 106 described above. Further, the network interface 611 allows the computing device 600 to connect to and communicate with other computing devices 640 via a network 630 (e.g., the Internet) as known in the art.

The actuator interface 613 may be configured to receive and transmit signals to/from the actuator 432 via the communication wire 431. For example, the actuator interface 613 may transmit a digital or analog signal to the actuator 432 instructing the actuator 432 to move the stopper 433 into the lock or unlock position. Additionally, the actuator interface 613 may receive signals indicating a status of the actuator 432 (e.g., indicating whether the actuator 432 is working properly, indicating whether the actuator 432 is in a lock or unlock position, etc.).

The ID device interface 615 may be configured to receive and transmit signals to/from the ID device 437 via the second communication wire 438. For example, the ID device interface 615 may receive identification information from the ID device 437 and forward the identification to the processor 601 to determine whether a user is authenticated to remove the coupler 101. Additionally, the ID device interface 615 may transmit a signal instructing the ID device 437 to capture identification information.

Additionally, the control electronics interface 615 may be configured to communicate with the control electronics 105. For example, the control electronics interface 615 may be configured to receive a signal from the control electronics 105 indicating that the coupler 101 is connected to the electric vehicle 210 so that the computing device 600 can send a signal causing the actuator 432 to lock the coupler 101.

In some embodiments, many of the steps discussed above with regards to FIG. 5 may be implemented with an application specific integrated circuit (ASIC). That is, the charging station 100 and/or coupler 101 may include an ASIC for performing various functions described herein, such as determining whether a user is authorized to remove the coupler 101. Further, the ASIC may be implemented within or in communication with various devices provided herein.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps may be optional in accordance with aspects of the disclosure.

What is claimed is:

1. A method, comprising:
receiving first identification information comprising a fingerprint scan from a fingerprint reader of a coupler;
transmitting a first signal to unlock the coupler so that the coupler may be removed from a charging station, wherein transmitting the first signal comprises supplying electric power to an actuator within the coupler to move the actuator into an unlock position;
detecting a connection between the coupler and an electric vehicle;
transmitting a second signal to lock the coupler to the electric vehicle in response to detecting the connection to the electric vehicle, wherein transmitting the second signal comprises supplying electric power to the actuator within the coupler to move the actuator into a lock position;
allowing the charging station to charge a battery of the electric vehicle;
determining whether a user is authorized to remove the coupler from the electric vehicle;
transmitting a third signal to unlock the coupler so that the coupler may be removed from the electric vehicle in response to determining that the user is authorized to remove the coupler, wherein transmitting the third signal comprises supplying electric power to the actuator within the coupler to move the actuator into the unlock position;
detecting a connection between the coupler and a charging station receptacle of the charging station; and
transmitting a fourth signal to lock the coupler to the charging station receptacle in response to detecting the connection to the charging station receptacle, wherein transmitting the fourth signal comprises supplying electric power to the actuator within the coupler to move the actuator into the lock position.

2. The method of claim 1, wherein the determining of whether the user is authorized comprises:
receiving second identification information; and
comparing the second identification information with the first identification information,
wherein the user is authorized when the second identification information matches the first identification information.

3. The method of claim 2, wherein the second identification information is received from the fingerprint reader.

4. A method, comprising:
receiving first identification information;
transmitting a signal to unlock a coupler so that the coupler may be removed from a charging station;
detecting a connection between the coupler and an electric vehicle;
transmitting a signal to lock the coupler to the electric vehicle in response to detecting the connection to the electric vehicle;
allowing a charging of a battery of the electric vehicle;
determining whether a user is authorized to remove the coupler from the electric vehicle, wherein the determining of whether the user is authorized comprises:
receiving second identification information; and
comparing the second identification information with the first identification information, wherein the user is authorized when the second identification information matches the first identification information;

transmitting a signal to unlock the coupler so that the coupler may be removed from the electric vehicle in response to determining that the user is authorized to remove the coupler;

detecting a connection between the coupler and a charging station receptacle of the charging station; and transmitting a signal to lock the coupler to the charging station receptacle in response to detecting the connection to the charging station receptacle, wherein the first identification information and the second identification information are received from a common identification device (ID device), and wherein the ID device is located on the coupler.

5. The method of claim 1, wherein the determining of whether the user is authorized comprises:

receiving second identification information; and determining whether the second identification information identifies the same user that the first identification information identifies, wherein the user is authorized when the second identification information and the first identification information identify the same user, and wherein the first identification information and the second identification information are received from different devices.

6. The method of claim 1, further comprising:

identifying a user based on the first identification information, wherein determining whether the user is authorized to remove the coupler includes determining whether the user is the identified user.

7. The method of claim 1, wherein the actuator comprises a solenoid within the coupler.

8. An electric vehicle charging station, comprising:

a control box configured to house control electronics configured to control an electric power supply for charging an electric vehicle;

a cable connected to the control box, the cable including a plurality of conductors for delivering the electric power supply;

a charging station receptacle located on an outside of the control box; and a coupler arranged at an end of the cable, the coupler comprising a fingerprint reader incorporated into a button and a locking mechanism configured to lock the coupler to the electric vehicle, to lock the coupler to the charging station receptacle, and to unlock the coupler in response to a signal indicating that a user has been authorized to remove the coupler, wherein the locking mechanism comprises an actuator, within the coupler, that is configured to move between a lock position and an unlock position in response to electrical signals provided by the electric vehicle charging station.

9. The electric vehicle charging station of claim 8, wherein the locking mechanism further comprises:

a snap configured to move in response to movement of the button and to latch onto the charging station receptacle and the electric vehicle, wherein the actuator is configured to lock the coupler to the charging station or the electric vehicle by preventing a user from moving the snap.

10. The electric vehicle charging station of claim 8, further comprising:

a processor; and memory storing computer-executable instructions that, when executed by the processor, cause the electric vehicle charging station to:

receive identification information obtained by the fingerprint reader;

determine whether the identification information identifies a user who is authorized to remove the coupler; and output the signal to the actuator to unlock the coupler when determining that the user is authorized to remove the coupler.

11. The electric vehicle charging station of claim 8, wherein the actuator comprises a solenoid.

12. The electric vehicle charging station of claim 8, wherein the coupler further comprises:

a snap configured to latch onto a groove of the electric vehicle; and a lever configured to raise the snap above the groove.

13. The electric vehicle charging station of claim 8, wherein the coupler further comprises:

a stopper configured to move between a stopper lock position and a stopper unlock position in response to movement of the actuator, wherein the stopper physically blocks the button from moving when the stopper is in the stopper lock position.

14. A coupler, comprising:

a handle including a face having contacts therein for electrically connecting conductors in a cable of an electric vehicle charging station to an electric vehicle inlet;

a button attached to the handle and configured to move between a first position and a second position;

a fingerprint reader incorporated into the button; and a locking mechanism configured to lock the coupler to a receptacle of the electric vehicle charging station, to lock the coupler to the electric vehicle inlet, and to unlock the coupler in response to a signal indicating that the coupler is authorized to be removed, wherein the locking mechanism comprises an actuator, within the coupler, that is configured to move between a lock position and an unlock position in response to electrical signals provided by the electric vehicle charging station.

15. The coupler of claim 14, wherein the locking mechanism further comprises:

a snap configured to move in response to movement of the button and to latch onto the receptacle of the electric vehicle charging station and the electric vehicle inlet, wherein the actuator is configured to move into the lock position to block the button from moving.

16. The coupler of claim 15, further comprising:

a communication wire configured to receive the electrical signals from the electric vehicle charging station via the cable and to provide the electrical signals to the actuator to control movement of the actuator.

17. The coupler of claim 15, further comprising:

a communication wire configured to transmit identification information, which is obtained by the fingerprint reader, to the electric vehicle charging station, wherein the actuator is within the handle and responsive to the fingerprint reader.

18. The coupler of claim 14, further comprising:

a stopper configured to move between a stopper lock position and a stopper unlock position in response to movement of the actuator, wherein the stopper physically blocks the button from moving into the second position when the stopper is in the stopper lock position.

19. The coupler of claim 14, wherein the actuator comprises a solenoid.

20. The coupler of claim 14, further comprising a snap configured to latch onto a groove of the electric vehicle.

* * * * *